UNITED STATES PATENT OFFICE.

LEO H. BAEKELAND, OF YONKERS, NEW YORK.

VARNISH.

954,666. Specification of Letters Patent. Patented Apr. 12, 1910.

No Drawing. Original application filed October 15, 1907, Serial No. 397,560. Divided and this application filed November 22, 1909. Serial No. 529,378.

*To all whom it may concern:*

Be it known that I, LEO H. BAEKELAND, a citizen of the United States, residing at Yonkers, in the county of Westchester and State of New York, have invented certain new and useful Improvements in Varnishes, of which the following is a specification.

Attempts have been made to manufacture varnishes by means of condensation products of phenols and formaldehyde. In some cases phenols and formaldehyde were made to react in presence of acid condensing agents or by alkalies followed by acidification, the result being in each case the production of condensation products which were permanently fusible and soluble. In other terms, a continued application of heat does not transform these resinous products into insoluble, infusible bodies, and the hardness of the layer produced by these varnishes is of rather inferior quality. Furthermore, heating of the varnished articles does not transform the varnish film into a hard, insoluble protective layer. In other cases a varnish was made by simply boiling phenols and formaldehyde without any condensing agents, and a varnish was thus obtained which could ultimately be changed by the application of heat into an infusible, insoluble layer. The present invention differs from the procedures above mentioned in that by the addition to the mixture of phenols and formaldehyde or their reaction products of a relatively small proportion of a base I am able to accelerate to a considerable degree the hardening and insolubilizing action of heat, and at the same time to impart to the varnish or to the coating obtained therefrom better qualities of permanency and quick drying. The addition of this base can be made at any stage of the process. Furthermore, solid, semi-solid or liquid materials of the most varied nature can be added, addition of such substances being made at any desired stage of the process, and desirable colors may be imparted to the product by the addition of suitable dyes or pigments.

In order to carry out my invention I may proceed as follows:—Equal amounts of commercial carbolic acid and commercial 40% formaldehyde solution are made to react upon each other in presence of a base. Water is separated and the obtained product afterward dissolved in a suitable amount of solvent. Instead of commercial carbolic acid I can use pure phenol or any of its homologues or a suitable mixture of these products or any equivalents thereof, which I have designated under the generic term of phenolic body. Instead of formaldehyde I can use the polymers of formaldehyde or in general any substances which engender formaldehyde. The proportion of formaldehyde can be widely varied, and in fact it is still possible to obtain acceptable results if the amount of formaldehyde indicated above is doubled or reduced to one-half. In such instances the final varnish will contain either an excess of formaldehyde or a proportion of free phenolic body.

By reason of their comparative cheapness it is preferred to employ as a condensing agent ammonia, anhydrous or aqueous, ammonium carbonate, caustic alkalies or their carbonates, anilin or pyridin, but other bases as for instance the hydrates of barium, strontium, or calcium may be used. Amins and amids, and in general all derivatives of the type $NH_3$ which possess basic properties are found to act in the same manner. Similarly all basic salts, or salts which by secondary reaction engender bases, as for instance alkali sulfids, acetates and cyanids, sodium triphosphate, borax, soaps, etc., may be used; also alkali sulfites may serve, for the reason that when boiled with formaldehyde they liberate alkali in accordance with the well known reaction:

$$CH_2O + SO_3Na_2 + H_2O = CH_2(OH)SO_3Na + NaOH.$$

The bases above referred to, and others having the requisite basic properties, are employed in variable proportions, according to their character and also according to the result desired. Additions of ammonia or caustic soda in so small a proportion as one-half per cent. of the weight of phenol used show a decided influence, but in most cases the amount of base in the varnish is somewhat larger but rarely attains 10% by weight of the phenolic body employed.

It should be understood that in the case of such basic compounds as alkali sulfids, cyanids, sodium triphosphate, or those that yield bases by reaction as for instance the alkali sulfites, the proportion of salt to be used should be calculated in proportion to the quantity of base liberated. If the base be strong or the amount of the same relatively large the reaction may begin at ordinary temperatures, and will usually, but not always, be indicated by a separation of the liquid mixture into two superposed layers, viz., an aqueous layer consisting of separated water containing some water-soluble materials, and an oily layer containing the initial products of dehydration. The reaction is accelerated and rendered more complete by heat.

The progress of the reaction may be followed by noting the increasing viscosity of the oily liquid. The heating is interrupted after a suitable consistence for the purposes in view has been attained, this condition being often reached in the course of a very few minutes. Continuation of the reaction or evaporation yields a more or less viscous, semi-solid or even solid product, which for certain purposes may be preferred to the oily liquid above referred to, being still soluble in alcohol or acetone and similar solvents, and in conjunction with these forming varnishes of excellent quality. Application of heat under proper conditions to the dry varnish renders it insoluble in all ordinary solvents, and substantially inert to acid and alkaline reagents.

When I specify the amount of free base as above I mean to designate the amount of base which actually remains as such in the product or the varnish made from it, it being well understood that if larger amounts of bases are used the same may be partially neutralized afterward by known methods, as by the judicious addition of an acid, thus reducing the temporarily employed base within the limits described above.

This application is, in so far as it relates to the composition of the varnish, a division of my prior application Ser. No. 397,560, filed October 15, 1907.

I claim:—

1. A varnish containing a volatile organic solvent and a condensation product of a phenolic body and formaldehyde, said condensation product characterized by its capability of transformation under the action of heat into an insoluble and infusible body, and by the presence therein of a base condensing agent.

2. A varnish containing a volatile organic solvent and a condensation product of a phenolic body and formaldehyde, said condensation product characterized by its capability of transformation under the action of heat into an insoluble and infusible body, and by the presence therein of a base condensing agent in proportions not exceeding one-fifth of the equimolecular proportion of phenolic body employed.

In testimony whereof, I affix my signature in presence of two witnesses.

LEO H. BAEKELAND.

Witnesses:
 H. S. TARBELL,
 MARY L. SHORT.